United States Patent Office 3,238,236
Patented Mar. 1, 1966

3,238,236
N-(MONOCHLORO-PERFLUORO-HIGHER ALKANOYL)AMINO-LOWER CARBOXYLIC ACIDS
Murray Hauptschein, Glenside, and Sameeh S. Toukan, Levittown, Pa., assignors to Pennsalt Chemicals Corporation, Philadelphia, Pa., a corporation of Pennsylvania
No Drawing. Filed May 22, 1963, Ser. No. 282,224
7 Claims. (Cl. 260—404)

This invention relates to chlorofluorinated compounds having valuable surface properties and more specifically is concerned with certain new derivatives of long chain monochloro-perfluorinated carboxylic acids which possess such surface properties in a particularly high degree.

It is known that relatively long chain perfluorinated carboxylic acids and salts thereof, e.g. perfluorooctanoic acid and its ammonium and metal salts, have unusual surface properties. They are known for example to reduce the surface tension of aqueous systems to unusually low values and thus have valuable uses as ultra-performance surfactants in such systems.

In the past it has been found that the surface activity of relatively long chain fluorinated acids and their derivatives is extremely sensitive to the replacement of one or more fluorine atoms in the fluorocarbon chain with other elements such as hydrogen, chlorine, bromine or the like. Thus, the single hydrogen atom in the omega hydro perfluorocarboxylic acids, $H(CF_2)_nCOOH$ has a drastic effect on the surface properties relative to the fully fluorinated analogs. Similarly, the chlorofluorocarboxylic acids, such as those of the formula $$Cl(CF_2CFCl)_nCF_2COOH$$

although completely halogenated and containing a high proportion of fluorine, do not display the extremely low surface energy characteristics of the fully fluorinated analogous compounds. Based on these observations, it has been considered that only the fully fluorinated materials are capable of providing extreme surface properties and that the presence of other substituents, particularly in the terminal portion of the fluorocarbon chain, would greatly reduce the surface activity of the compound.

According to the invention it has been found that certain new derivatives of monochloroperfluorinated carboxylic acids having from ten to twelve carbon atoms in the monochloroperfluoroalkyl portion display remarkably superior surface properties despite the presence of the chlorine atom in the otherwise perfluorinated alkyl group, properties which are equal to or superior to the performance of related products in commercial use containing a perfluorinated alkyl chain. It has been found further that the new compounds of the invention are remarkably superior in their surface properties to the monochloroperfluorinated carboxylic acids from which they are derived.

The new compounds of the invention may be represented by the general formula:

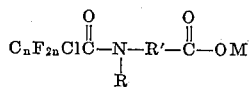

where $C_nF_{2n}Cl$ is a monochloroperfluoroalkyl group wherein the alkyl is terminally chloro substituted which may have a straight or branched chain and which has a chain length of at least nine carbon atoms; where $n$ is an integer having a value ranging from 10 to 12, where R is hydrogen or an alkyl group (which may be straight or branched) having from 1 to 4 carbon atoms; where R' is an alkylene radical or a monohydroxyalkylene radical (which may be straight or branched) having from 1 to 6 carbon atoms and where M is hydrogen, an alkali metal or ammonium.

Of particular value are compounds of the above type where R is hydrogen or an alkyl group containing from 1 to 2 carbon atoms; and those in which R' is an alkylene radical having from 1 to 3 carbon atoms.

Typical examples of the new compounds of the invention shown in the form of the free acid are the following:

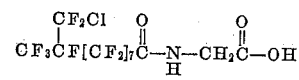

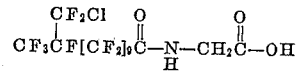

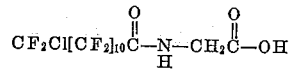

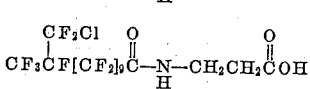

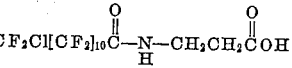

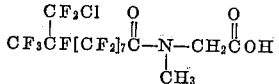

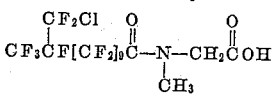

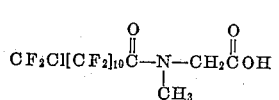

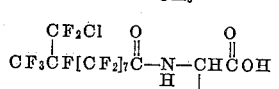

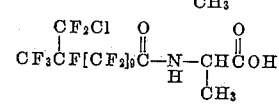

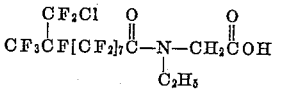

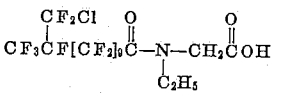

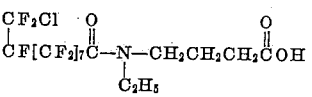

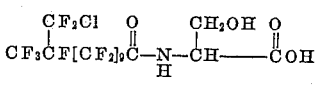

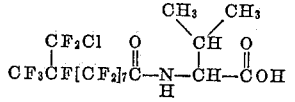

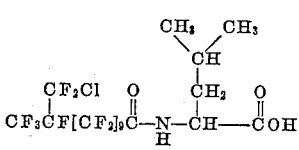

The new compounds of the invention may be prepared by the direct reaction of the acid fluoride or the acid chloride of a monochloroperfluorinated carboxylic acid of the proper chain length with an amino acid. This reaction may be illustrated by the reaction of monochloroperfluoroundecanoic acid fluoride with glycine in accordance with the following:

The reaction is preferably carried out by dissolving or suspending the monochloroperfluoro acid fluoride in an anhydrous solvent and mixing the solution slowly with a suspension of the amino acid in the same solvent and then refluxing the mixture for several hours. The amino acid may be added slowly to the monochloroperfluoro acid fluoride or conversely, the acid fluoride may be added slowly to the amino acid. The reaction mixture is filtered to remove insoluble material which generally includes excess amino acid and its hydrogen fluoride salt, after which the amide product may be isolated by evaporation of the solvent and purified if necessary by crystallization, or similar techniques. Suitable anhydrous solvents include e.g. diethyl ether, dimethoxyethane, $CH_3OCH_2CH_2OCH_3$, tetrahydrofuran, trichlorotrifluoroethane and benzene. Reaction temperatures of from 0° C. to 150° C. and more usually from 20° C. to 100° C. will generally be used. Sufficient amino acid is employed to insure high conversions of the monochloroperfluoro acid fluoride, molar ratios of the amino acid to the monochloroperfluoro acid fluoride of from 1:1 to about 3:1 being generally preferred. Reaction may be generally carried out most conveniently at atmospheric pressure and reaction times of from about 10 minutes to 10 hours are generally satisfactory.

The compounds of the invention may also be prepared by the direct reaction of an amino acid with a monochloroperfluorinated halosulfate of the formula $$C_nF_{2n}ClOSO_2Z$$

where $n$ is an integer ranging from 11 to 13 and where Z is chlorine or fluorine. This method may be illustrated by the reaction of monochloroperfluoroundecyl chlorosulfate with glycine in accordance with the following.

This reaction is carried out preferably by dissolving or suspending the monochloroperfluorinated halosulfate in an anhydrous solvent and the solution then mixed with a suspension of the amino acid in the same solvent followed by refluxing for sufficient time to insure complete reaction. Insoluble material is then removed by filtration after which the crude product is isolated by evaporation of the solvent followed sometimes by recrystallization.

If desired a tertiary amine, e.g. triethylamine or pyridine may be added to the reaction mixture in either of the above methods of synthesis to act as a scavenger for the hydrogen halide liberated during the reaction.

Another less preferred procedure for the preparation of the compounds of the invention involves the initial preparation of an amide by the reaction of a monochloroperfluorinated acid halide or a monochloroperfluorinated halosulfate with a primary amine. The amide thus produced is then reacted with metallic sodium in an organic solvent such as toluene to form a sodium derivative which is then reacted with a chloro or bromo ester to form an ester derivative which is then hydrolyzed to provide the desired end product. This method may be illustrated by the preparation of

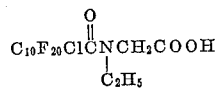

starting with the chlorosulfate $C_{11}F_{22}ClOSO_2Cl$ in accordance with the following:

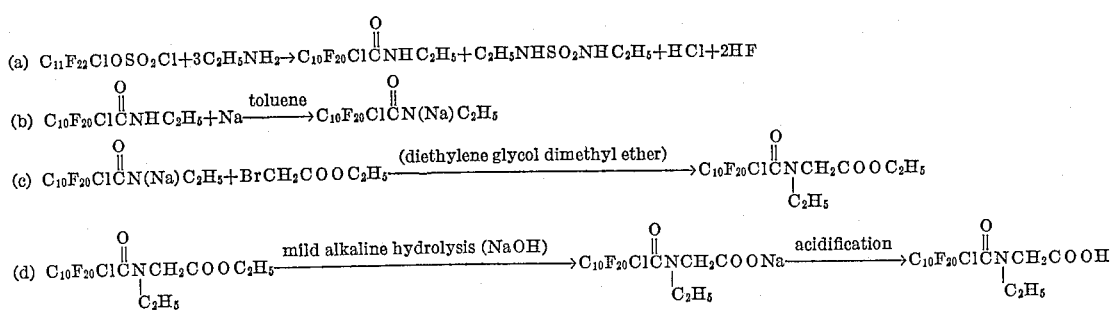

After preparation of the free acid as described above, the alkali metal salts such as the ammonium salt, potassium salt, sodium salt, lithium salt, etc. may be readily prepared, preferably by dissolving the free acid in a solvent such as isopropanol, ethanol or methanol, and titrating the solution to its equivalence point with a solution of the alkali metal hydroxide preferably in a solvent such as ethanol, methanol, or an aqueous alcoholic solution. The salt is readily recovered by evaporation of the solvent and drying at a temperature range of 40–80° C.

The ammonium salt may be readily prepared by passing ammonia gas through a solution of the free acid in a solvent such as diethyl ether, methanol, isopropanol, $CF_2ClCFCl_2$ or acetone, after which the solvent is evaporated to recover the ammonium salt.

The monochloroperfluorinated carboxylic acid fluorides used to prepare the compounds of the invention may be obtained by the reaction of monochloroperfluorinated iodides with fuming sulfuric acid as described in co-pending application Serial No. 212,137, filed July 24, 1962, now abandoned, of Murray Hauptschein and Chester L. Parris, for Preparation of Fluorinated Organic Compounds. The monochloroperfluorinated iodide precursors may be prepared by telomerization procedures such as by the reaction of

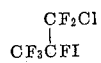

or $CF_2ClCF_2I$ with tetrafluoroethylene to produce telomers of the formula

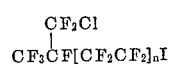

and $CF_2ClCF_2[CF_2CF_2]_nI$ respectively.

The monochloroperfluorinated chlorosulfates or fluorosulfates may be prepared by the reaction of monochloroperfluorinated iodides with chlorosulfonic or fluorosulfonic acid following the procedures described in detail in co-pending application Serial No. 735,702, filed May 16, 1958, now abandoned, of Murray Hauptschein and Milton Braid, for Halogenated Organic Compounds.

Examples of suitable amino acids useful for preparing the compounds of the invention are the following:

| | |
|---|---|
| Glycine | $NH_2CH_2COOH$ |
| β-Alanine | $NH_2CH_2CH_2COOH$ |
| Sarcosine | 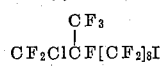 |
| Alanine |  |
| Serine |  |
| γ-Aminobutyric acid | $NH_2CH_2CH_2CH_2COOH$ |
| Valine | $\begin{array}{c}CH_3 \quad CH_3 \\ \diagdown \diagup \\ CH \\ | \\ NH_2CH-COOH\end{array}$ |
| Leucine | 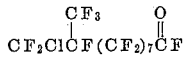 |

The following examples illustrate the preparation of the new compounds of the invention.

EXAMPLE 1.—PREPARATION OF 10-CHLORO-PERFLUORO(9-METHYLDECANOYL)FLUORIDE

A 1400 milliliter stainless steel autoclave is charged with 900 grams of fuming sulfuric acid (35% by weight of $SO_3$) and 348 grams (0.49 mole) of 1-chloro-10-iodoperfluoro(2-methyldecane), $$CF_2ClCF[CF_2]_8I \quad (CF_3)$$

The autoclave is sealed and heated with shaking at 145–155° C. for 16 hours, after which it is cooled and opened. On cooling to room temperature, the organic phase is separated from the sulfuric acid phase by decantation. The organic product, weighing 280 grams, is vacuum distilled. There is obtained 176.9 grams (67.2% yield) of the acid fluoride $$CF_2ClCF(CF_3)[CF_2]_7COF$$

having a boiling point of 99° C. at 29 mm. Hg, and 67.9 grams (25.5% yield) of the acid $$CF_2ClCF(CF_3)[CF_2]_7COOH$$

and a product hydrolyzable thereto, and about 27 grams (7.8%) of unreacted iodide. The infrared spectrum of the acid fluoride shows a characteristic strong peak at 5.30μ while the carboxylic acid shows characteristic strong bands in the infrared spectrum at 3.20μ, 5.62μ and 6.95μ.

EXAMPLE 2.—PREPARATION OF N-[10-CHLOROPERFLUORO(9 - METHYLDECANOYL)] - AMINOACETIC ACID

To a stirred suspension of 7.50 grams (0.10 mole) of glycine, $NH_2CH_2COOH$, in 70 milliliters of anhydrous diethyl ether there is slowly added a solution of 11.60 grams (0.02 mole) of

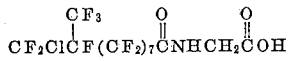

in 30 milliliters of anhydrous diethylether. This mixture is refluxed under nitrogen for 10 hours at atmospheric pressure (reflux temperature approximately 35° C.). The reaction mixture is filtered and the filtrate is washed with about 200 milliliters of water, dried with anhydrous magnesium sulfate and evaporated on steam bath to give 10.75 grams (84% yield) of a white residue. Upon recrystallization of this product from benzene there is obtained a white crystalline solid having a melting point of 118–120° C., this being the product N-[10-chloroperfluoro(9-methyldecanoyl)]aminoacetic acid

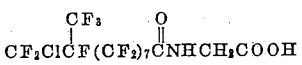

Analysis, calculated for $C_{13}H_4ClF_{20}NO_3$: C, 24.5; H, 0.63; Cl, 5.56; N, 2.20; molecular weight, 638. Found: C, 24.3; H, 0.40; Cl, 5.54; N, 2.05; molecular weight (neutralization equivalent), 633. The infrared spectrum of this compound shows strong bands at 5.83μ and 6.45μ characteristic of a secondary amide.

EXAMPLE 3.—PREPARATION OF POTASSIUM N-[10 - CHLORO-PERFLUORO(9-METHYLDECANOYL)]AMINOACETATE

The potassium salt of the acid

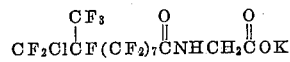

is prepared by dissolving the acid in a large excess of isopropanol and then titrating this solution to equivalence point with a 0.5 N potassium hydroxide in ethanol solution. The solution is evaporated to dryness at a temperature up to 80° C. and then dried in a vacuum desiccator at 40° C. to provide the potassium salt

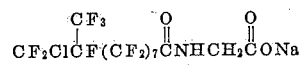

a white crystalline solid.

EXAMPLE 4.—PREPARATION OF SODIUM N-[10-CHLORO - PERFLUORO(9-METHYLDECANOYL)] AMINOACETATE

Following a procedure similar to that described in Example 3 except that a 0.5 N sodium hydroxide in ethanol solution is used instead of the potassium hydroxide solution, the sodium salt

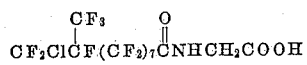

a white crystalline solid is obtained.

EXAMPLE 5.—PREPARATION OF AMMONIUM N-[10 - CHLORO-PERFLUORO(9-METHYLDECANOYL)]AMINOACETATE

The acid

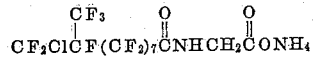

is dissolved in a large excess of ethyl ether. Ammonia gas is bubbled through the solution at room temperature until precipitation is complete. The ether solvent is removed by evaporation under vacuum to provide the ammonium salt

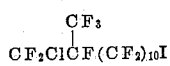

a white crystalline solid.

EXAMPLE 6.—PREPARATION OF 12-CHLORO-PERFLUORO(11-METHYLDODECANOYL)FLUORIDE

A 1400 milliliter stainless steel autoclave is charged with 325 grams (0.4 mole) of the iodide $$CF_2ClCF(CF_3)(CF_2)_{10}I$$

and 900 grams of fuming sulfuric acid (35% $SO_3$). The autoclave is sealed and heated with shaking at 158–163° C. for 20 hours. The autoclave is cooled, opened, and the contents poured into a glass container. The spent sulfuric acid is decanted from the solidified organic product, weighing 289.5 grams. Upon vacuum distillation of this product there is obtained 109 grams (71% yield) of the acid fluoride

having a boiling point of 98° C. at 5 mm. Hg, 32 grams (21% yield) of the acid

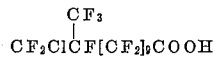

and a product hydrolyzable thereto, together with 142 grams of unreacted iodide. The infrared spectrum of the acid fluoride shows a characteristic strong band at $5.30\mu$ while the carboxylic acid shows characteristic strong bands at $3.20\mu$, $5.62\mu$ and $6.95\mu$.

EXAMPLE 7.—PREPARATION OF N - [12 - CHLORO-PERFLUORO(11 - METHYLDODECANOYL)]-AMINOACETIC ACID

Following the procedures of Example 2, the perfluorinated acid fluoride

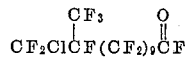

is reacted with glycine in a molar ratio of acid fluoride to glycine of 1:5 in refluxing diethyl ether for 5 hours. From this reaction mixture an 85% yield of a white crystalline solid

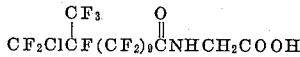

having a melting point of 139.5–140.5° C. is obtained. Analysis, calculated for $C_{15}H_4ClF_{24}NO_3$: C, 24.4; H, 0.55; Cl, 4.81; N, 1.90; molecular weight, 738. Found: C, 24.5; H, 0.66; N, 2.07; Cl, 4.77; molecular weight (neutralization equivalent), 729. The infrared spectrum of this compound displays strong bands at $5.85\mu$ and $6.46\mu$.

The potassium, sodium and ammonium salts of the above acid are prepared following the procedures of Examples 3, 4 and 5 respectively. These salts are white crystalline solids.

EXAMPLE 8.—PREPARATION OF N-[10 CHLORO-PERFLUORO(9-METHYLDECANOYL)] - 3 - AMINOPROPIONIC ACID

Following the procedures described in Example 2, the chloroperfluorinated acid fluoride

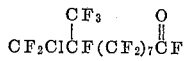

is reacted with β-aminopropionic acid in a ratio of acid fluoride to the amino acid of 1:5 in refluxing anhydrous diethyl ether for 6 hours. From this reaction mixture there is obtained a 72% yield of a white crystalline solid

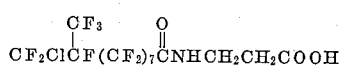

having a melting point of 99.5–100.5° C. Analysis, calculated for $C_{14}H_6ClF_{20}NO_3$: C, 25.8; H, 0.93; Cl, 5.44; N, 2.15; molecular weight, 652. Found: C, 25.8; H, 0.99; Cl, 5.15; N, 2.03; molecular weight (neutralization equivalent), 656. The infrared spectrum of this compound displays strong bands at $5.85\mu$ and $6.45\mu$.

The potassium, sodium and ammonium salts of the above acid are prepared according to the methods described in Examples 3, 4 and 5 respectively. These salts are white crystalline solids.

EXAMPLE 9.—PREPARATION OF N-[12-CHLORO-PERFLUORO(11 - METHYLDODECANOYL)] - 3-AMINOPROPIONIC ACID

Following the procedures described in Example 2, the acid fluoride

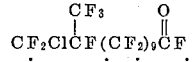

is reacted with β-aminopropionic acid in a ratio of the acid fluoride to the amino acid of 1:5 in refluxing diethyl ether for 5 hours. From this reaction there is obtained a 73% yield of a white crystalline solid product

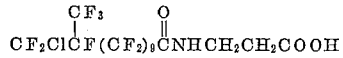

having a melting point of 123–124.5° C. Analysis, calculated for $C_{16}H_6ClF_{24}NO_3$: C, 25.6; H, 0.80; Cl, 4.72; N, 1.86; molecular weight, 752. Found: C, 25.6; H, 1.01; Cl, 4.41; N, 1.60; molecular weight (neutralization equivalent), 749. The infrared spectrum of this compound displays strong bands at $5.87\mu$ and $6.44\mu$.

The potassium, sodium and ammonium salts of the above acid are prepared following the procedures described in Examples 3, 4 and 5 respectively. These salts are white crystalline solids.

EXAMPLE 10.—PREPARATION OF N-METHYL-N-[10 - CHLORO - PERFLUORO(9 - METHYLDECANOYL)]AMINOACETIC ACID

To a stirred suspension of 8.90 grams (0.10 mole) of sarcosine, $$HN-CH_2COOH$$
$$|$$
$$CH_3$$

in 70 milliliters of anhydrous dimethoxyethane there is gradually added a solution of 11.60 grams (0.02 mole) of the acid fluoride

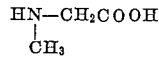

in 30 milliliters of anhydrous dimethoxyethane. This mixture is refluxed under nitrogen for 7 hours at atmospheric pressure (reflux temperature of about 85° C.). The reaction mixture is then filtered to remove 8.2 grams of insoluble material and the filtrate distilled under vacuum to remove the solvent. To the residue is added 50 milliliters of diethyl ether and the mixture is washed with water. The ether layer is then dried with anhydrous magnesium sulfate and evaporated on a steam bath to give 10.0 grams (77% yield) of a liquid residue which rapidly solidifies on standing at room temperature. Recrystallization of this product from benzene gives a white crystalline product having a melting point of 80–81° C. consisting of the product

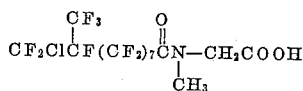

Analysis, calculated for $C_{14}H_6ClF_{20}NO_3$: C, 25.8; H, 0.93; Cl, 5.44; N, 2.15; molecular weight, 6.52. Found: C, 25.5; H, 1.30; Cl, 5.37; N, 2.19; molecular weight (neutralization equivalent), 650. The infrared spectrum of this compound displays strong bands at $5.72\mu$ and $6.01\mu$.

The potassium, sodium and ammonium salts of the above acid are prepared following the procedures of Examples 3, 4 and 5 respectively. These salts are white crystalline solids.

EXAMPLE 11.—PREPARATION OF N-METHYL-N-[12 - CHLOROPERFLUORO(11 - METHYLDODECANOYL)]AMINOACETIC ACID

Following the procedures of Example 10, the chloroperfluorinated acid fluoride

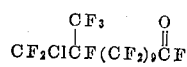

is reacted with sarcosine $CH_3NHCH_2COOH$ in a molar ratio of acid fluoride to sarcosine of about 1:5 in refluxing dimethoxyethane for 6 hours. There is obtained from this reaction a 71% yield of the product

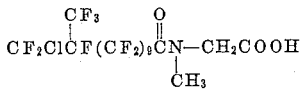

a white crystalline solid having a melting point of 102.5–104° C. Analysis, calculated for $C_{16}H_6ClF_{24}NO_3$: Cl, 25.6; H, 0.80; Cl, 4.72; N, 1.86; molelcular weight, 752. Found: C, 25.6; H, 0.72; Cl, 4.90; N, 2.25; molecular weight (neutralization equivalent), 760. The infrared spectrum of this compound displays strong bands at $5.71\mu$ and $6.00\mu$.

The potassium, sodium and ammonium salts of the above acid are prepared following the procedures of Examples 3, 4 and 5 respectively. These salts are white crystalline solids.

The compounds prepared according to the foregoing examples having a terminally branched monochloroperfluoroalkyl chain represent particularly preferred embodiments of the invention. The following groups of compounds are of especial value both from the standpoint of ease of preparation and desirable properties:

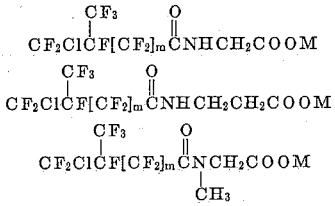

where $m$ is an integer from 7 to 9, and where M is hydrogen, alkali metal or ammonium.

The new compounds of the invention are characterized by their extraordinarily high surface activity. As mentioned previously they have been found to be more effective in a marked and surprising degree than the monochloroperfluorinated acids from which they are derived as well as of comparable or superior activity to perfluorinated analogous compounds in commercial use.

One particularly advantageous application for the compounds of the invention is their use as leveling agents for aqueous wax and/or resin emulsions which are widely used in the form of so-called self-polishing wax formulations which dry to a shine without buffing. These formulations comprise basically an aqueous phase which generally comprises at least about 50% and usually from 50% to 90% by weight of the formulation and dispersed in the aqueous phase a non-volatile film forming material which is usually a wax and/or a natural or synthetic resin which generally comprises from 10 to 50% by weight of the formulation, and a minor amount e.g. from 1–10% by weight of an emulsifying agent which serves to keep the film former dispersed in the aqueous phase. Minor amounts of other modifying agents notably plasticizers may also be included.

Suitable film forming materials include natural and synthetic waxes such as carnauba, candellila, ouricury, beeswax, paraffin wax, micro-crystalline waxes, montan and the like. Suitable film forming resins include e.g. shellac, polyethylene, polystyrene, polyacrylates, such as polybutylacrylate, polyvinylacetate, polyvinylchloride, and various copolymers such as copolymers of vinylidene chloride and acrylonitrile, and the like.

In some cases, a portion of the film former component may comprise an alkali soluble resin such as terpene modified phenolic resins, or rosin maleates or rosin fumerates. Such resins usually employed in minor amounts relative to the other film formers improve leveling characteristics and also enhance the removability of the polish with standard detergents. The film forming material may include mixtures of waxes, mixtures of resins, or mixtures of waxes and resins. Suitable emulsifying agents serving to keep the film former dispersed in the aqueous phase include e.g., anionic emulsifiers such as oleates or stearates of triethanolamine or of morpholine, alkali metal soaps of fatty acids such as sodium stearate or sodium oleate; cationic emulsifiers such as quaternary amine salts, e.g. trimethyl octadecyl ammonium chloride, or fatty amine acetates such as n-dodecyl amine acetate; nonionic emulsifying agents such as condensates of ethylene oxide with alkylated phenols or condensates of ethylene oxide with fatty acids such as oleic or stearic acid.

Suitable plasticizers, which are usually added in small amounts, include, for example, phosphate esters such as tricresyl phosphate, tributylmethyl phosphate, and phthalate esters such as dibutylphthalate and the like.

A necessary property of such self-polishing wax emulsions is that they spread easily and evenly on all types of floor surfaces to produce a uniform, high gloss film upon drying without the necessity of buffing. A formulation having this property is said to have good "leveling" characteristics. In order to achieve good leveling characteristics it is customary to employ a small amount of a so-called "leveling agent" whose function is to reduce the surface tension of the emulsion and thus produce good wetting of the surface to be coated. This wetting promotes the leveling of the liquid film producing a uniform coating of the film former covering the entire surface. Because of their remarkable surface properties, compounds containing a relatively long perfluorocarbon chain, such as relatively long chain carboxylic acids and sulfonic acids and various derivatives thereof have been employed for this purpose. Because of the high cost of these materials, it is highly desirable that they be effective in the smallest possible concentrations, and the minimum concentration at which the fluorinated compound will produce satisfactory leveling is a measure of its effectiveness.

The following comparative tests in which various fluorinated compounds, including those of the invention, were incorporated in a standard self-polishing wax formulation illustrate the outstanding surface properties of the compounds of the invention. In these tests, a standard formulation, designated Formulation A, having the following composition, was employed:

*Formulation A*

| Component: | Parts by weight |
|---|---|
| Aqueous dispersion containing 30% by weight of polyethylene resin particles having melting point 213–221° F. | 222 |
| Aqueous dispersion containing 15% by weight of acrylic resin (Rhoplex B–83) | 1150 |
| Diethylene glycol monoethyl ether, $CH_2OHCH_2OCH_2CH_2OC_2H_5$ | 60 |
| Nonyl phenol - ethylene oxide condensation product, 9–10 mols ethylene oxide/mol of phenol | 12 |
| Tri(2-ethylhexyl) phosphate | 14 |
| Distilled water | 1968 |

To this formulation there was added varying amounts of various fluorinated leveling agents, including the compounds of the invention, and the minimum concentration at which effective leveling was observed was determined in each case. In order to obtain strictly comparative data, the same test procedures and the same type of surface to be coated were employed in each case. The test procedure was as follows:

A section of tile, 4½″ x 4½″ is laid horizontally with the fiinished surface upward. A teaspoonful (approximately 5 milliliters) of the polish formulation is poured onto the tile surface. Using only the bottom of the spoon, the liquid is spread until the entire surface area is covered. The tile is then set into a vertical position to allow the excess liquid to drain and the coating to dry. A visual inspection of the surface was made after approximately ten minutes. The minimum effective concentration is that which produces a completely coated surface with no puddling or heavily coated areas and which dries to a uniform glossy film. The tile employed in these tests had a surface composed of unfilled polyvinylchloride selected because of the difficulty of obtaining good leveling on such a surface.

In these tests, a series of the compounds of the invention having 10 and 12 carbon atoms respectively in the monochloroperfluoroalkyl portion $C_nF_{2n}Cl$ were tested to determine their minimum effective concentration, while at the same time, corresponding monochloroperfluorocarboxylic acids having the same number of carbon atoms in the monochloroperfluoroalkyl portion were similarly tested for minimum effective concentration for producing satisfactory leveling. Also included in the tests was a compound of similar structure having a terminal carboxylic acid portion and a perfluorinated alkyl portion presently used commercially as a leveling agent in self-polishing wax formulations. The results of these tests are shown in Table 1.

TABLE 1

| Compound (as $NH_4$ or alkali metal salt) | Leveling activity (minimum concentration percent by wt. in Formulation A for satisfactory leveling) |
|---|---|
| Commercial perfluoroalkyl leveling agent | 0.12 |
| $C_{10}F_{20}ClCOOH$ | 0.60 |
| $C_{10}F_{20}ClCONHCH_2COOH$ | 0.09 |
| $C_{10}F_{20}ClCON(CH_3)CH_2COOH$ | 0.12 |
| $C_{10}F_{20}ClCONHCH_2CH_2COOH$ | 0.12 |
| Commercial perfluoroalkyl leveling agent | 0.12 |
| $C_{12}F_{24}ClCOOH$ | 0.30 |
| $C_{12}F_{24}ClCONHCH_2COOH$ | 0.08 |
| $C_{12}F_{24}ClCON(CH_3)CH_2COOH$ | 0.09 |

As is apparent from the above data, in each case, the required concentration in the wax formulation to produce satisfactory leveling for the compounds of the invention was less than one-third and in some cases less than one-sixth that required for corresponding monochloroperfluorinated carboxylic acids having the same number of carbon atoms. In all cases, the compounds of the invention were at least equivalent to or superior in activity to the commercial leveling agent having a perfluoroalkyl rather than a monochloroperfluoroalkyl "tail."

The high leveling activity of the compound of the invention is sharply dependent on the size of the monochloroperfluoroalkyl "tail." Similar compounds having a smaller monochloroperfluoroalkyl "tail" such as one with 8 carbon atoms, require from two to three times the concentration in a self-polishing wax formulation to produce comparable leveling effects. Compounds with a larger monochloroperfluoroalkyl tail such as one with 14 carbon atoms are similarly of much lower effectiveness probably because of the extremely low water solubility of these higher members.

The extraordinarily high surface activity of the compounds of the invention, as illustrated by the foregoing data, is highly advantageous in that it permits the compounds to be employed in considerably lower concentrations at a corresponding considerable savings in cost. The required concentration of leveling agent will rarely exceed about 0.1% by weight and will generally be used in concentrations of the order of 0.0001 to 0.05% by weight. The test formulation employed in the foregoing tests is a difficult one to level on any surface and the polyvinyl chloride surface employed is one which is quite difficult to wet and further increases the difficulties in obtaining good leveling. Since in most cases the leveling difficulties will not be as severe, the compounds of the invention will usually be employed in considerably lower concentrations than those indicated in the foregoing tests. In the case for example of formulations such as the following used to coat substrates such as rubber tile, linoleum, vinyl asbestos tile and the like, the compounds of the invention will be employed in concentrations of the order of 0.0001% to 0.2% to give satisfactory leveling characteristics:

*Formulation B*

| Component: | Parts by weight |
|---|---|
| Aqueous dispersion containing 36% by weight of polystyrene particles having an average particle size of about 0.03 microns containing emulsifying agent | 420 |
| Shellac | 26.8 |
| Ammonium hydroxide | 4 |
| Aqueous dispersion containing 30% by weight of polyethylene resin particles having melting point of 213–221° F. | 260 |
| Terpene-phenolic alkali soluble resin | 14 |
| Distilled water | 920 |
| Tri(2-ethylhexyl)phosphate | 22 |

*Formulation C*

| Component: | Parts by weight |
|---|---|
| Aqueous dispersion containing 15% by weight of acrylic resin (Rhoplex B–83) | 725 |
| Ammonium hydroxide solution of alkali soluble phenolic resin containing 15% by weight of resin | 165 |
| Aqueous dispersion containing 30% by weight of polyethylene resin particles having melting point 213–221° F. | 110 |
| $CH_2OHCH_2OCH_2CH_2OC_2H_5$ | 15 |
| Nonyl phenol-ethylene oxide condensation product, 9–10 mols ethylene oxide/mol of phenol | 3 |
| Tri(2-ethylhexyl)phosphate | 3.5 |

*Formulation D*

| Component: | Parts by weight |
|---|---|
| Part (a)— | |
| Carnauba wax | 135 |
| Microcrystalline wax | 67.5 |
| Oleic acid | 24.8 |
| Caustic soda | 3.6 |
| Borax | 6.8 |
| Distilled water | 1125 |
| Part (b)— | |
| Shellac | 37.7 |
| Ammonium hydroxide (concentrated) | 7.3 |
| Distilled water | 105 |

Formulation D is made up by mixing 454 parts by volume of Part (a) with 109 parts by volume of Part (b) and 346 parts by volume of distilled water.

*Formulation E*

| Component: | Parts by weight |
|---|---|
| Part (a)— | |
| Aqueous dispersion containing 36% by weight of polystyrene particles having an average particle size of about 0.03 micron | 8000 |
| Dibutylmethyl phosphate | 192 |
| Dibutyl phthalate | 240 |
| Distilled water | 16,864 |
| Part (b)— | |
| Aqueous dispersion containing 30% by weight of polyethylene resin particles having melting point of 213–221° F. | 110 |
| Oleic acid | 22 |
| Morpholine | 22 |
| Distilled water | 846 |
| Part (c)— | |
| Shellac | 450 |
| Sodium tetraborate (borax) | 54 |
| Distilled water | 3696 |

Formulation E is made up by mixing 60 parts by volume of Part (a) with 10 parts by volume of Part (b) and 30 parts by volume of Part (c).

In addition to their use as leveling agents in so-called self-polishing wax formulations as described above, the compounds of the invention are also useful as surfactants in the emulsion polymerization of ethylenically unsaturated compounds such as olefins, acrylates and the like, particularly in the polymerization or copolymerization of fluorinated olefins and acrylates. The following example illustrates the use of the compounds of the invention for such applications.

EXAMPLE 12.—POLYMERIZATION AND COPOLYMERIZZATION OF

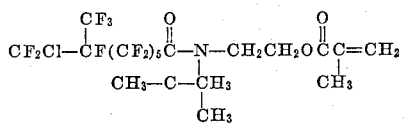

(a) *Preparation of monomer.*—A solution of 48.3 grams (0.1 mole) of

in 30 milliliters of anhydrous diethyl ether is added slowly to a stirred solution of 46.3 grams (0.25 mole) of tertiary-butyl-aminoethylmethacrylate,

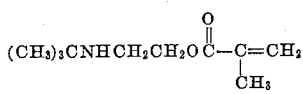

in 120 milliliters of anhydrous diethyl ether under dry nitrogen. During the addition, 6.5 grams of a very fine white precipitate is formed which is filtered off after refluxing the reaction mixture for 3 hours. The filtrate is washed with 200 milliliters of water followed by six 100 milliliter portions of 1 N HCl, then with three 100 milliliter portions of 5% sodium bicarbonate solution and finally dried with anhydrous magnesium sulfate, and evaporated on a steam bath to afford 53.7 grams (83% yield) of a liquid residue which solidifies slowly on standing at room temperature. This product, having a melting point of 34.5–35.5° C., has the structure

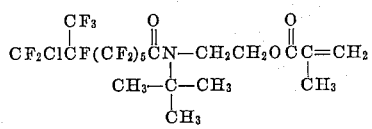

The infrared spectrum of this compound shows an ester band at 5.76μ, and amide band at 5.9μ and a 6.1μ peak characteristic of a doublebond. Analysis, calculated for $C_{19}H_{18}ClF_{16}NO_3$: C, 35.2; H, 2.80; Cl, 5.47; N, 2.16. Found: C, 35.2; H, 2.80; Cl, 5.25; N, 1.96.

(b) *Homopolymerization.*—A solution of about 0.5 gram of the potassium salt of the compound of Example 10, i.e.

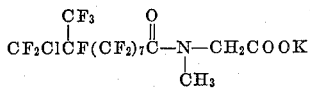

in 12.6 milliliters of deoxygenated, deionized water is placed in a 7 ounce glass bottle. To this solution is added 10 grams of the above monomer dissolved in 5.4 grams of reagent grade acetone followed by 0.05 gram of potassium persulfate as polymerization catalyst. The bottle is filled with nitrogen, capped, placed in a bath held at a constant temperature of 65° C., and maintained at this temperature with agitation for a period of 8 hours.

There is obtained from this reaction a latex containing a polymer having the repeating units

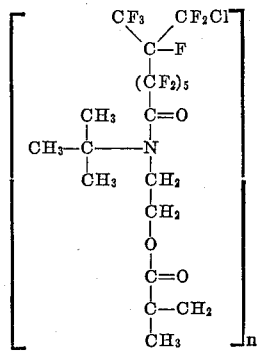

The homopolymer latex produced is ideally suited for the treatment of textiles and other fibrous materials in order to render them resistant to wetting by aqueous systems. The textiles or other materials impregnated with such a latex are water repellent due to the long chain chloroperfluoalkyl groups contained in the polymer chain.

(c) *Copolymerization.*—The same procedures as described above for the homopolymerization are followed except that 5.0 grams of butyl methacrylate is used as a comonomer together with only 5.0 grams of the above-mentioned monomer. There is obtained approximately 10 grams of a copolymer in the form of an aqueous latex having similar utility as the homopolymer.

In addition to their utility as leveling agents for self-polishing aqueous wax emulsions and as surfactants in emulsion polymerizations, the compounds of the invention are also useful in the form of the free acid as intermediates for the formation of Werner type chrome complexes which in turn are useful for the impregnation of leather, paper and other fibrous materials to impart a high degree of water repellancy thereto.

We claim:

1. Compounds of the formula

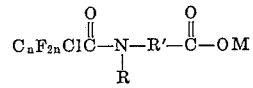

where $C_nF_{2n}Cl$ is a monochloroperfluoroalkyl group wherein the alkyl is terminally chloro substituted having from 10 to 12 carbon atoms and having a chain length of at least nine carbon atoms; where *n* is an integer from 10 to 12; where R is selected from the class consisting of hydrogen and alkyl groups having from 1 to 4 carbon atoms; where R' is selected from the class consisting of alkylene and monohydroxy alkylene radicals having from 1 to 6 carbon atoms; and where M is selected from the class consisting of hydrogen, alkali metal and ammonium.

2.

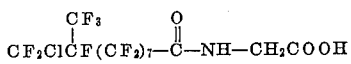

3.

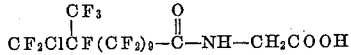

4.

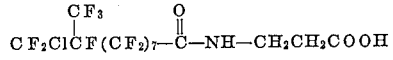

5.

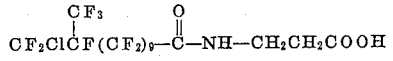

6. 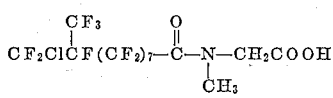
7. 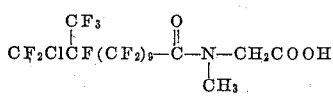
References Cited by the Examiner
UNITED STATES PATENTS
| | | | |
|---|---|---|---|
| 2,502,478 | 4/1950 | Padbury | 260—534 X |
| 2,523,470 | 9/1950 | Kropa | 260—334 X |
| 2,809,990 | 10/1957 | Brown | 260—534 |
| 2,939,888 | 6/1960 | Barnhart | 260—539 X |
| 3,055,953 | 9/1962 | Smeltz | 260—559 X |
| 3,091,643 | 5/1963 | Wiley | 260—539 X |
CHARLES B. PARKER, *Primary Examiner.*
LEON ZITVER, LORRAINE A. WEINBERGER,
*Examiners.*